United States Patent
Li et al.

(10) Patent No.: US 10,685,658 B2
(45) Date of Patent: Jun. 16, 2020

(54) METHOD AND DEVICE FOR PROCESSING VOICEPRINT AUTHENTICATION

(71) Applicant: BAIDU ONLINE NETWORK TECHNOLOGY (BEIJING) CO., LTD., Beijing (CN)

(72) Inventors: Chao Li, Beijing (CN); Bengu Wu, Beijing (CN); Lin Zhu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/501,292

(22) PCT Filed: Jul. 4, 2016

(86) PCT No.: PCT/CN2016/088435
§ 371 (c)(1),
(2) Date: Feb. 2, 2017

(87) PCT Pub. No.: WO2017/113680
PCT Pub. Date: Jul. 6, 2017

(65) Prior Publication Data
US 2018/0293990 A1    Oct. 11, 2018

(30) Foreign Application Priority Data
Dec. 30, 2015   (CN) .......................... 2015 1 1024873

(51) Int. Cl.
*G10L 17/22* (2013.01)
*G10L 17/04* (2013.01)
(Continued)

(52) U.S. Cl.
CPC .............. *G10L 17/22* (2013.01); *G10L 17/02* (2013.01); *G10L 17/04* (2013.01); *G10L 17/06* (2013.01); *G10L 17/18* (2013.01)

(58) Field of Classification Search
CPC ....... G10L 15/00; G10L 15/22; G10L 17/005; H04M 2201/40
See application file for complete search history.

(56) References Cited

U.S. PATENT DOCUMENTS 5,897,616 A * 4/1999 Kanevsky ............... G10L 17/24
379/88.02
6,665,644 B1 * 12/2003 Kanevsky ............... G10L 17/26
704/246

(Continued)

OTHER PUBLICATIONS

Harb et al., "Gender identification using a general audio classifier", Conference on Multimedia and Expo. ICME' . . . , 2003—ieeexplore.ieee.org. (Year: 2003) 2003.*

(Continued)

*Primary Examiner* — Fariba Sirjani
(74) *Attorney, Agent, or Firm* — Lathrop GPM LLP

(57) ABSTRACT

The present disclosure provides a method and a device for processing voiceprint authentication. The method includes: extracting a first feature vector for each first speech segment of a training set by a gender-mixed voiceprint baseline system based on Deep Neural Network; training a gender classifier according to the first feature vector for each first speech segment and a pre-labeled first gender label of each first speech segment; training Deep Neural Network models for different genders respectively according to speech data of different genders of the training set; and training uniform background models, feature vector extracting models and linear probability discriminant analysis models for different genders respectively according to the Deep Neural Network models for different genders and the speech data of different genders of the training set. A voiceprint authentication processing model for gender distinguishing is built, thus improving the efficiency and accuracy of voiceprint authentication.

15 Claims, 6 Drawing Sheets

(51) Int. Cl.
*G10L 17/18* (2013.01)
*G10L 17/02* (2013.01)
*G10L 17/06* (2013.01)

(56) References Cited

U.S. PATENT DOCUMENTS

| | | | | |
|---|---|---|---|---|
| 7,006,605 | B1* | 2/2006 | Morganstein | G06F 21/32 379/88.01 |
| 7,266,497 | B2* | 9/2007 | Conkie | G10L 13/06 704/253 |
| 7,769,588 | B2* | 8/2010 | Kompe | G10L 15/065 704/243 |
| 7,949,526 | B2* | 5/2011 | Ju | G10L 15/005 704/246 |
| 8,515,750 | B1* | 8/2013 | Lei | G10L 15/26 379/88.01 |
| 8,559,682 | B2* | 10/2013 | Zhang | G06K 9/00221 382/118 |
| 9,058,748 | B2* | 6/2015 | Kozakaya | G09B 5/00 |
| 9,564,123 | B1* | 2/2017 | Mont-Reynaud | G06Q 30/0277 |
| 2003/0110038 | A1* | 6/2003 | Sharma | G06K 9/00221 704/270 |
| 2005/0132235 | A1* | 6/2005 | Teunen | G06F 21/32 726/19 |
| 2005/0180547 | A1* | 8/2005 | Pascovici | G10L 17/04 379/88.01 |
| 2007/0299671 | A1* | 12/2007 | McLachlan | G10L 17/26 704/500 |
| 2008/0059156 | A1* | 3/2008 | Han | G10L 15/08 704/207 |
| 2009/0125473 | A1* | 5/2009 | Amini | G06N 20/00 706/50 |
| 2012/0166365 | A1* | 6/2012 | Tur | G06N 5/022 706/11 |
| 2015/0112684 | A1* | 4/2015 | Scheffer | G10L 17/14 704/257 |
| 2015/0154002 | A1* | 6/2015 | Weinstein | G06F 9/451 715/728 |
| 2016/0019883 | A1* | 1/2016 | Aronowitz | G10L 17/04 704/244 |
| 2016/0042739 | A1* | 2/2016 | Cumani | G10L 17/06 704/239 |
| 2016/0248768 | A1* | 8/2016 | McLaren | H04L 63/10 |
| 2016/0284346 | A1* | 9/2016 | Visser | G10L 15/16 |
| 2017/0040016 | A1* | 2/2017 | Cui | G10L 15/063 |
| 2018/0068103 | A1* | 3/2018 | Pitkanen | H04L 63/0861 |
| 2019/0013013 | A1* | 1/2019 | McLaren | G10L 15/063 |

OTHER PUBLICATIONS

Snyder, David, et al., Time Delay Deep Neural Network-Based Universal Background Models for Speaker Recognition, Automatic Speech Recognition and Understanding (ASRU), 2015 IEEE Workshop on Dec. 17, 2015, pp. 92-97.*

Cumani, Sandro, et al., Probabilistic Linear Discriminant Analysis of I-Vector Posterior Distributions, IEEE 2013, pp. 7644-7648.*

* cited by examiner

METHOD AND DEVICE FOR PROCESSING VOICEPRINT AUTHENTICATION

CROSS-REFERENCE TO RELATED APPLICATIONS

This application is a U.S. national phase of International Application No. PCT/CN2016/088435, filed Jul. 4, 2016, which claims priority to and benefits of Chinese Patent Application Serial No. 201511024873.7, filed with the State Intellectual Property Office of P. R. China on Dec. 30, 2015, and titled with "method and device for processing voiceprint authentication", the entire content of which is incorporated herein by reference.

FIELD

The present disclosure relates to the field of voiceprint authentication, and more particularly to a method for processing voiceprint authentication and a device for processing voiceprint authentication.

BACKGROUND

With the continuous progress of technology, the application fields of Voiceprint Recognition (VPR) technology become wider.

It can confirm whether a certain speech segment is from someone assigned by Voiceprint Recognition. For example, it may need to confirm the voice of a user in attendance or banking transactions. Before voiceprint recognizing, the voiceprint of the speaker may be modeled, which is the so-called process of "training" or "learning".

The training process of voiceprint recognition in the related art uses the general model for voiceprint training and voiceprint recognition, in which the accuracy is not high.

SUMMARY

Embodiments of a first aspect of the present disclosure provide a method for processing voiceprint authentication, including: extracting a first feature vector for each first speech segment of a training set by a gender-mixed voiceprint baseline system based on Deep Neural Network; training a gender classifier according to the first feature vector for each first speech segment and a pre-labeled first gender label of each first speech segment; training Deep Neural Network models for different genders respectively according to speech data of different genders of the training set; and training uniform background models, feature vector extracting models and linear probability discriminant analysis models for different genders respectively according to the Deep Neural Network models for different genders and the speech data of different genders of the training set.

Embodiments of a second aspect of the present disclosure provide a device for processing voiceprint authentication, including: an extracting module, configured to extract a first feature vector for each first speech segment of a training set by a gender-mixed voiceprint baseline system based on Deep Neural Network; a generating module, configured to train a gender classifier according to the first feature vector for each first speech segment and a pre-labeled first gender label of each first speech segment; a first training module, configured to train Deep Neural Network models for different genders respectively according to speech data of different genders of the training set; and a second training module, configured to train uniform background models, feature vector extracting models and linear probability discriminant analysis models for different genders respectively according to the Deep Neural Network models for different genders and the speech data of different genders of the training set.

Embodiments of a third aspect of the present disclosure provide a non-transitory computer storage medium, configured to store a computer program, in which the computer program is configured to implement the method for processing voiceprint authentication according to the embodiments of the first aspect of the present disclosure.

Embodiments of a fourth aspect of the present disclosure provide an apparatus for processing voiceprint authentication, including: one or more processors; a storage; one or more modules configured to be stored in the storage, and when executed by the one or more processors, to perform following acts: extracting a first feature vector for each first speech segment of a training set by a gender-mixed voiceprint baseline system based on Deep Neural Network; training a gender classifier according to the first feature vector for each first speech segment and a pre-labeled first gender label of each first speech segment; training Deep Neural Network models for different genders respectively according to speech data of different genders of the training set; and training uniform background models, feature vector extracting models and linear probability discriminant analysis models for different genders respectively according to the Deep Neural Network models for different genders and the speech data of different genders of the training set.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
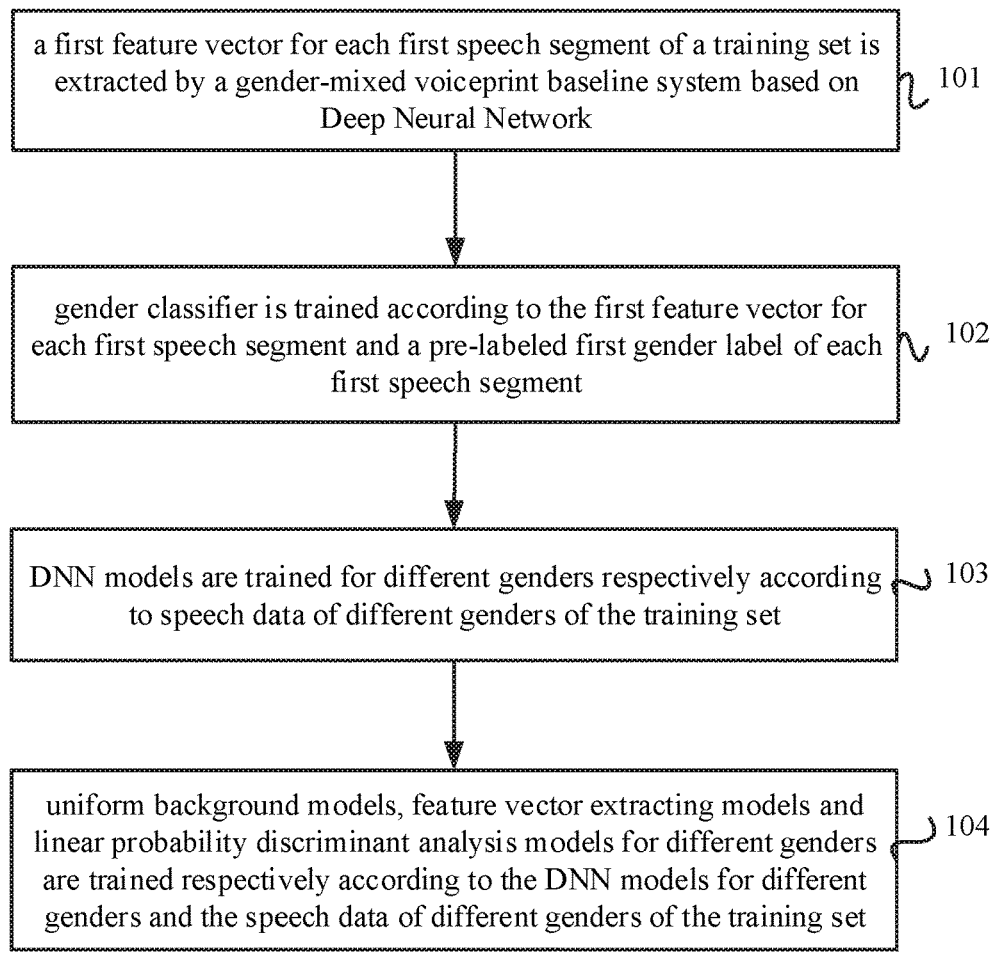
FIG. 1 is a flow chart of a method for processing voiceprint authentication according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The method and the device for processing voiceprint authentication according to embodiments of the present disclosure will be descripted with reference to drawings.

FIG. 1 is a flow chart of a method for processing voiceprint authentication according to an embodiment of the present disclosure.

As shown in FIG. 1, the method for processing voiceprint authentication includes followings.

In step 101, a first feature vector for each first speech segment of a training set is extracted by a gender-mixed voiceprint baseline system based on Deep Neural Network.

In step 102, a gender classifier is trained according to the first feature vector for each first speech segment and a pre-labeled first gender label of each first speech segment.

Specifically, in order to train and build a voiceprint authentication processing model for distinguishing gender, the gender classifier is trained by the gender-mixed voiceprint baseline system based on Deep Neural Network (DNN for short), so as to recognize a gender of an input speech by the gender classifier and then to assign a gender label for the input speech by the gender classifier.

Figure 2:
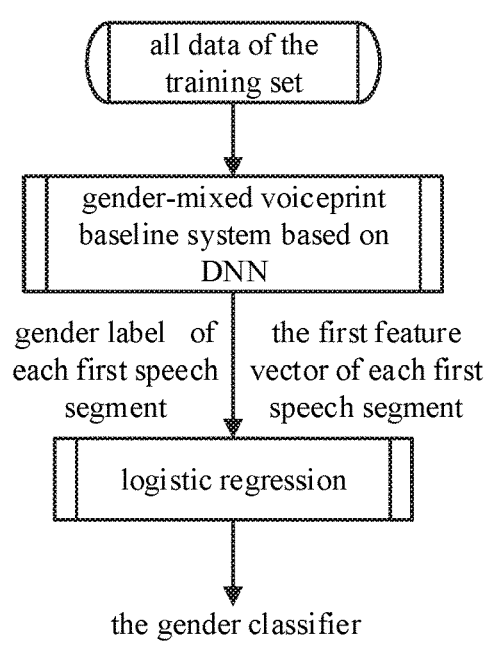
FIG. 2 is a schematic diagram illustrating generating a gender classifier according to an embodiment of the present disclosure.

FIG. 2 is a schematic diagram illustrating generating a gender classifier. As shown in FIG. 2, how to generate the gender classifier by the gender-mixed voiceprint baseline system based on DNN is specifically illuminated as follows.

A training set containing a plurality of first speech segments is preset. Each first speech segment in the training set is pre-labeled with corresponding gender information. For instance, the first one of the first speech segments corresponds to the gender of male, and the second one of the first speech segments corresponds to the gender of female.

Each first speech segment in the training set is input the gender-mixed voiceprint baseline system based on DNN. Data processing is performed on each first speech segment by the voiceprint baseline system based on DNN to extract the first feature vector corresponding to each first speech segment.

And then, the gender classifier is trained according to the first feature vector of each first speech segment and the pre-labeled first gender label of each first speech segment, thus the gender of an input speech might be recognized by the gender classifier so as to assign a gender label to the input speech.

In the step 103, DNN models are trained for different genders respectively according to speech data of different genders of the training set.

Specifically, the DNN models are trained for different genders respectively according to the speech data of different genders of the training set and the preset DNN algorithm, which means that a male DNN model and a female DNN model are trained respectively.

The male DNN model is configured to receive male speech data and to output posterior probabilities corresponding to the male speech data. The female DNN model is configured to receive female speech data and to output posterior probabilities corresponding to the female speech data.

In the step 104, uniform background models, feature vector extracting models and linear probability discriminant analysis models for different genders are trained respectively according to the DNN models for different genders and the speech data of different genders of the training set.

Specifically, the uniform background models, the feature vector extracting models and the linear probability discriminant analysis models for different genders are trained respectively according to the DNN models for different genders and the speech data of different genders of the training set.

The function of each model is explained as follows.

The uniform background model is configured to normalize the posterior probabilities outputted by the DNN model.

The feature vector extracting model is configured to receive the posterior probabilities outputted by the DNN model and the speech data input by the user, and to extract a second feature vector of the speech data according to a preset algorithm.

The linear probability discriminant analysis model is configured to obtain a similarity by comparing the second feature vector of the speech data input by the user with a pre-stored voiceprint registration template.

Figure 3:
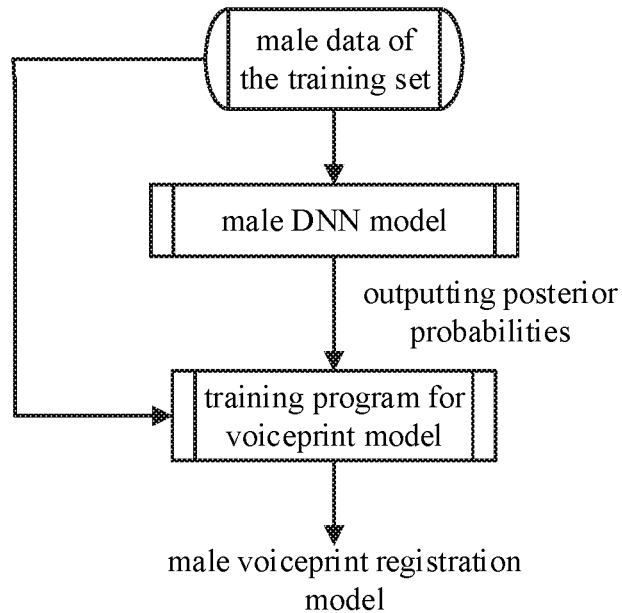
FIG. 3 is a schematic diagram illustrating generating a processing model for male voiceprint authentication according to an embodiment of the present disclosure.

FIG. 3 is a schematic diagram illustrating generating a processing model for male voiceprint authentication. As shown in FIG. 3, this process specifically includes followings.

Posterior probabilities are outputted by processing the male speech data of the training set with the male DNN model, and the posterior probabilities are normalized and the normalized posterior probabilities are used to train the uniform background model of the male voiceprint authentication processing model.

The posterior probabilities outputted by the male DNN model and the male speech data are obtained, a second feature vector of the male speech data is extracted according to a preset algorithm, and the feature vector extracting model of the male voiceprint authentication processing model is trained.

The linear probability discriminant analysis model of the male voiceprint authentication processing model is trained by comparing the similarity of the second feature vector of the male speech data with a pre-stored male voiceprint registration template.

Figure 4:
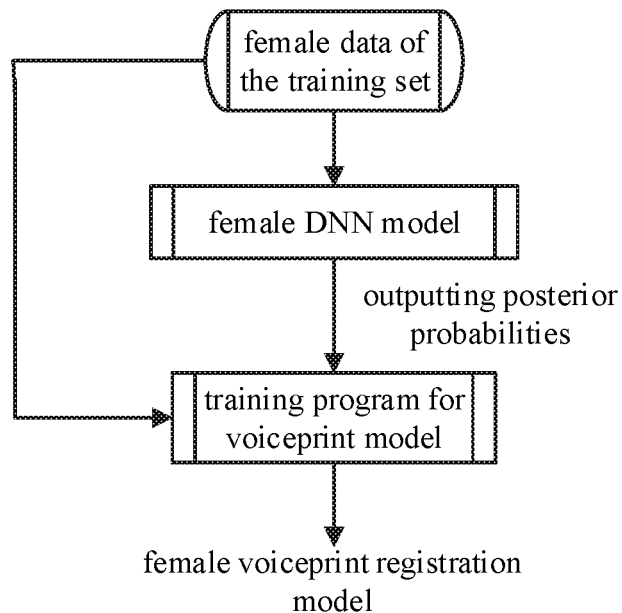
FIG. 4 is a schematic diagram illustrating generating a processing model for female voiceprint authentication according to an embodiment of the present disclosure.

FIG. 4 is a schematic diagram illustrating generating a processing model for female voiceprint authentication. As shown in FIG. 4, this process specifically includes followings.

Posterior probabilities are outputted by processing the female speech data of the training set with the female DNN model, and the posterior probabilities are normalized and the normalized posterior probabilities are used to train the uniform background model of the female voiceprint authentication processing model.

The posterior probabilities outputted by the female DNN model and the female speech data are obtained, a second feature vector of the female speech data is extracted according to a preset algorithm, and the feature vector extracting model of the female voiceprint authentication processing model is trained.

The linear probability discriminant analysis model of the female voiceprint authentication processing model is trained by comparing the similarity of the second feature vector of the female speech data with a pre-stored female voiceprint registration template.

With the method for processing voiceprint authentication according to embodiments of the present disclosure, by extracting the first feature vector for each first speech segment of the training set by the gender-mixed voiceprint baseline system based on DNN, training the gender classifier according to the first feature vector for each first speech segment and the pre-labeled first gender label of each first speech segment, training the DNN models for different genders respectively according to the speech data of different genders of the training set; and training the uniform background models, the feature vector extracting models and the linear probability discriminant analysis models for different genders respectively according to the DNN models for different genders and the speech data of different genders of the training set, the voiceprint authentication processing model for gender distinguishing is built, thus improving the efficiency and accuracy of voiceprint authentication.

Figure 5:
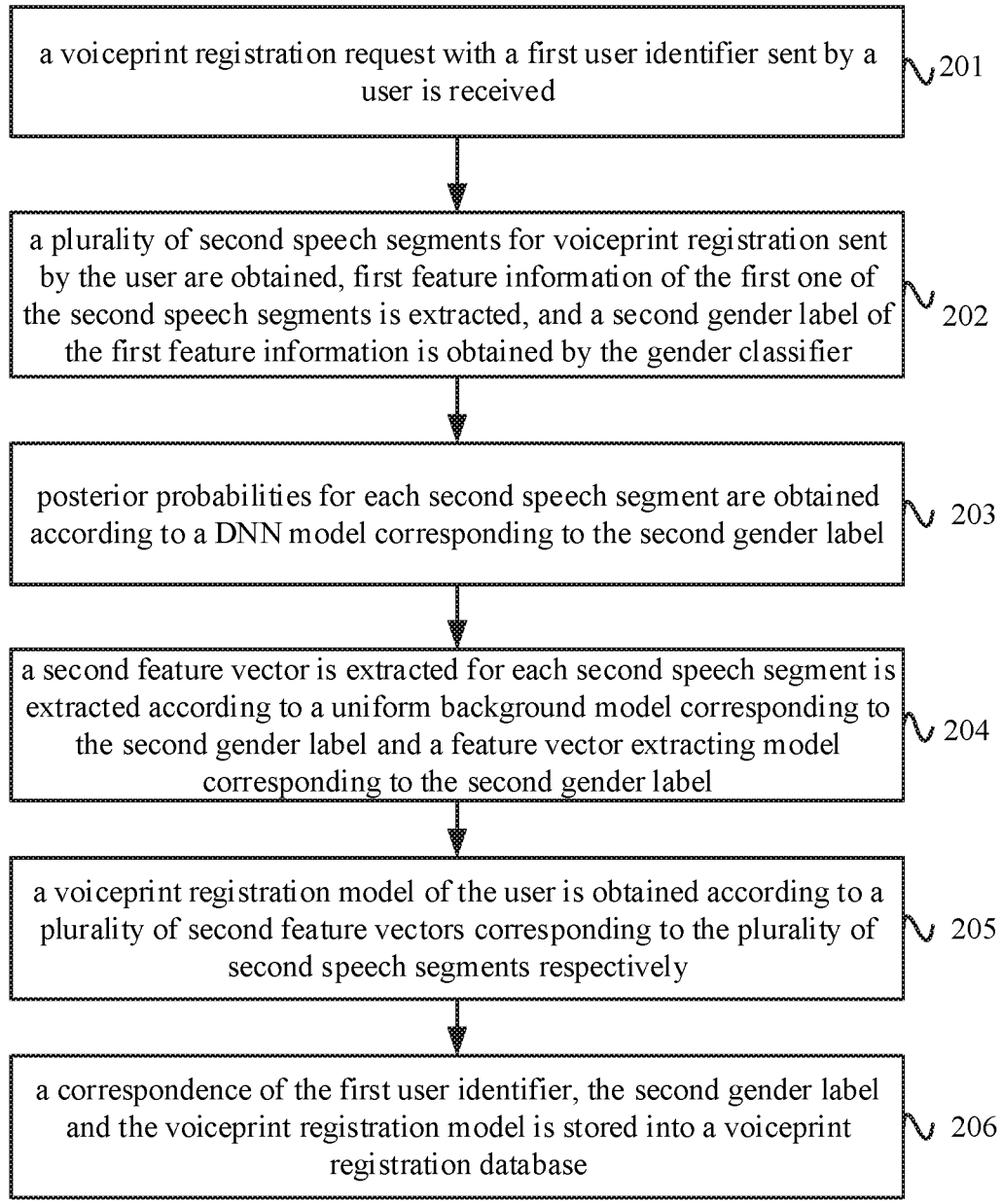
FIG. 5 is a flow chart of a method for processing voiceprint authentication according to another embodiment of the present disclosure.

FIG. 5 is a flow chart of a method for processing voiceprint authentication according to another embodiment of the present disclosure.

As shown in FIG. 5, the method for processing voiceprint authentication further includes steps as follows after the step 104.

In step 201, a voiceprint registration request with a first user identifier sent by a user is received.

In step 202, a plurality of second speech segments for voiceprint registration sent by the user are obtained, first feature information of the first one of the second speech segments is extracted, and a second gender label of the first feature information is obtained by the gender classifier.

Specifically, the user who needs to carry on voiceprint recognition should register beforehand in the voiceprint recognition processing model. Firstly, the user may send the voiceprint recognition request with the user identifier to the processing model for voiceprint recognition.

After receiving the voiceprint recognition request, the voiceprint recognition processing model prompts the user to input speeches. The user sends the plurality of the second speech segments for voiceprint registration to the voiceprint recognition processing model.

The voiceprint recognition processing model extracts the first feature information of the first one of the second speech segments, and sends the first feature information to the gender classifier generated beforehand. The gender classifier analyzes the first feature information to obtain a second gender label of the first feature information, or a second gender label of the first one of the second speech segments.

In step 203, posterior probabilities for each second speech segment are obtained according to a DNN model corresponding to the second gender label.

In step 204, a second feature vector is extracted for each second speech segment is extracted according to a uniform background model corresponding to the second gender label and a feature vector extracting model corresponding to the second gender label.

In step 205, a voiceprint registration model of the user is obtained according to a plurality of second feature vectors corresponding to the plurality of second speech segments respectively.

In step 206, a correspondence of the first user identifier, the second gender label and the voiceprint registration model is stored into a voiceprint registration database.

Specifically, the plurality of second speech segments sent by the user is sent to the DNN model corresponding to the second gender label of the first one of the second speech segments returned by the gender classifier. That is to say, if the first one of the second speech segments is a male voice, the plurality of second speech segments is sent to the male DNN model. If the first one of the second speech segments is a female voice, the plurality of second speech segments is sent to the female DNN model.

A plurality of posterior probabilities for each second speech segment is obtained according to the DNN model corresponding to the second gender label.

Each posterior probability is normalized according to the uniform background model corresponding to the second gender label to obtain normalized posterior probabilities. The second feature vector is extracted for each second speech segment according to each second speech segment and the corresponding normalized posterior probabilities by the feature vector extracting model trained beforehand.

The voiceprint registration model of the user is obtained according to a plurality of second feature vectors corresponding to the plurality of second speech segments respectively. There are many ways to obtain the voiceprint registration model, which may be chosen according to different application needs, such as follows.

An average feature vector of the plurality of second feature vectors is obtained as the voiceprint registration model of the user.

And then, the correspondence of the first user identifier of the user requesting to register, the second gender label and the voiceprint registration model of the user are stored into the voiceprint registration database, so as to perform the voiceprint recognition according to the voiceprint registration database.

With the method for processing voiceprint authentication according to embodiments of the present disclosure, firstly, obtaining the gender label of the first one of the second speech segments from the user by the gender classifier, obtaining the posterior probabilities of each second speech segment according to the DNN model corresponding to the gender label, extracting the second feature vector for each second speech segment respectively according to the uniform background model and the feature vector extracting model corresponding to the gender label, obtaining the voiceprint registration model of the user according to the second feature vectors, and storing the correspondence of the user identifier, the gender label and the voiceprint registration model into the voiceprint registration database, thus a voiceprint authentication processing model for distinguishing gender is built, improving the efficiency and accuracy of voiceprint authentication.

Figure 6:
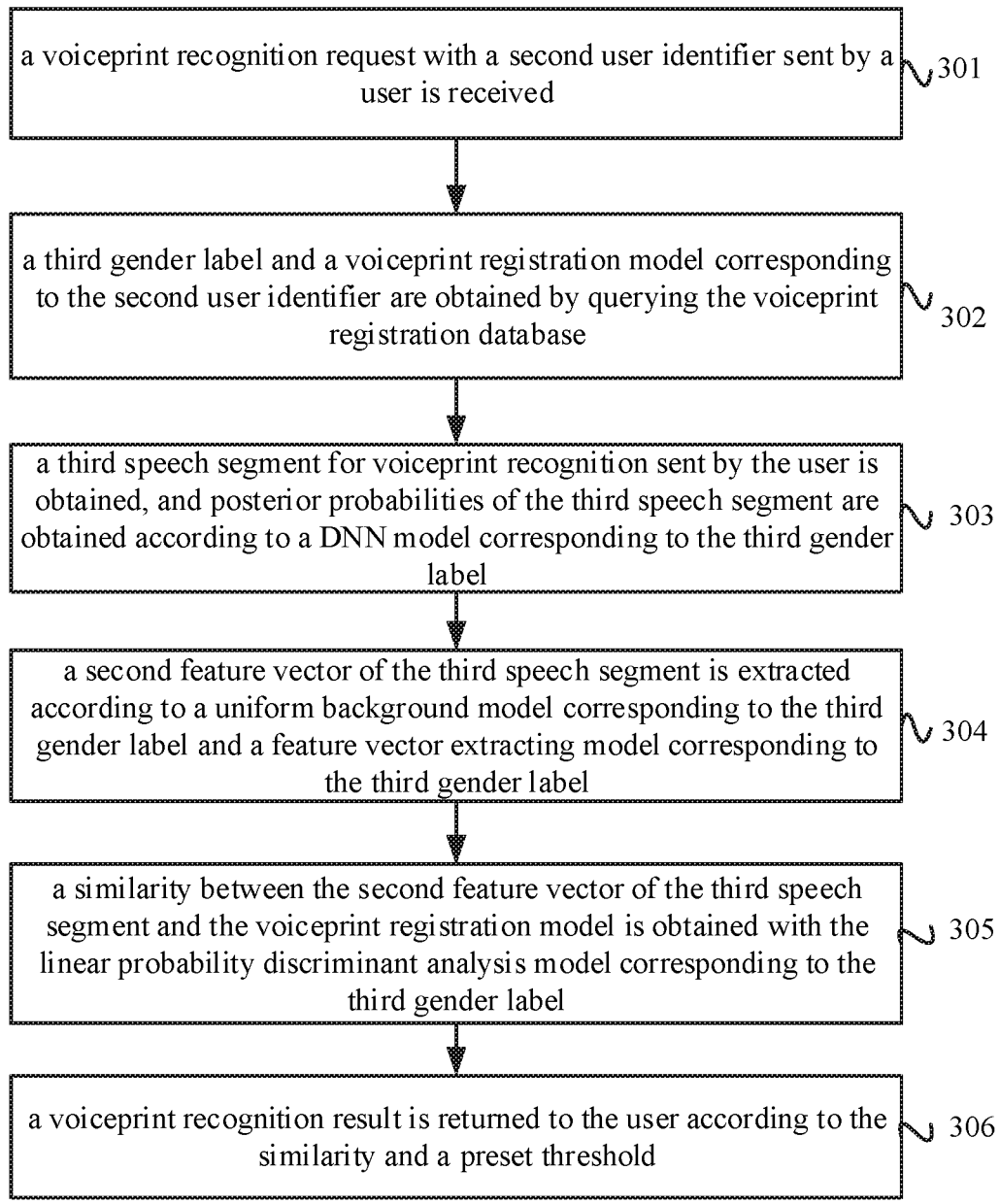
FIG. 6 is a flow chart of a method for processing voiceprint authentication according to another embodiment of the present disclosure.

FIG. 6 is a flow chart of a method for processing voiceprint authentication according to another embodiment of the present disclosure.

As shown in FIG. 6, the method for processing voiceprint authentication includes following steps.

At step 301, a voiceprint recognition request with a second user identifier sent by a user is received.

At step 302, a third gender label and a voiceprint registration model corresponding to the second user identifier are obtained by querying the voiceprint registration database.

Specifically, the user who needs voiceprint recognition may input the second user identifier into the voiceprint authentication processing model, and may send the voiceprint recognition request with the second user identifier.

The voiceprint authentication processing model parses the voiceprint recognition request sent by the user to obtain the second user identifier, and queries the voiceprint registration database to obtain the third gender label corresponding to the second user identifier and the voiceprint registration model corresponding to the second user identifier. Thus the third gender label and the voiceprint registration model of the user are obtained.

At step 303, a third speech segment for voiceprint recognition sent by the user is obtained, and posterior probabilities of the third speech segment are obtained according to a DNN model corresponding to the third gender label.

Specifically, the third speech segment for voiceprint recognition sent by the user is obtained, and the third speech segment is sent to the DNN model corresponding to the third gender label. The DNN model processes the third speech segment to obtain the posterior probabilities of the third speech segment.

At step 304, a second feature vector of the third speech segment is extracted according to a uniform background model corresponding to the third gender label and a feature vector extracting model corresponding to the third gender label.

Specifically, the posterior probabilities of the third speech segment are sent to the uniform background model corresponding to the third gender label. The uniform background model normalizes each of the posterior probabilities. The second feature vector of the third speech segment is extracted according to the feature vector extracting model trained preset and the normalized posterior probabilities.

At step 305, a similarity between the second feature vector of the third speech segment and the voiceprint registration model is obtained with the linear probability discriminant analysis model corresponding to the third gender label.

At step 306, a voiceprint recognition result is returned to the user according to the similarity and a preset threshold.

Specifically, the second feature vector of the third speech segment is sent to the linear probability discriminant analysis model corresponding to the third gender label. The linear probability discriminant analysis model corresponding to the third gender label compares the second feature vector of the third speech segment with the pre-stored voiceprint registration model of the user to obtain the similarity.

The similarity and the preset threshold are compared.

If the similarity is greater than or equal to the preset threshold, a success of voiceprint recognition will be returned.

If the similarity is less than the preset threshold, a failure of voiceprint recognition will be returned.

With the method for processing voiceprint authentication according to embodiments of the present disclosure, firstly, obtaining the third gender label and the voiceprint registration model corresponding to the second user identifier by querying the voiceprint registration database, extracting the second feature vector of the third speech segment according to the uniform background model and the feature vector extracting model corresponding to the third gender label, obtaining the similarity between the second feature vector of the third speech segment and the voiceprint registration model with the linear probability discriminant analysis model, and returning the voiceprint recognition result according to the similarity and the preset threshold, thus the voiceprint authentication processing model for gender distinguishing is built, improving the efficiency and accuracy of voiceprint authentication.

In order to implement the above embodiments, embodiments of the present disclosure provide a device for processing voiceprint authentication.

Figure 7:
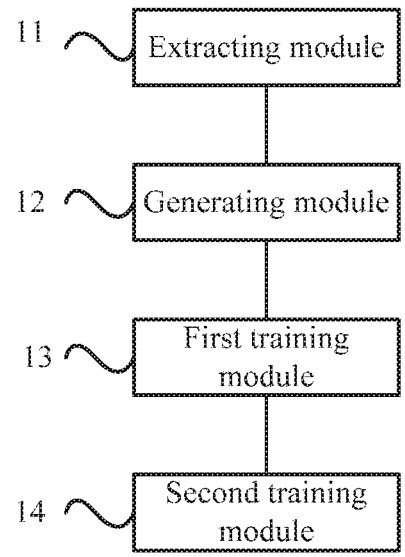
FIG. 7 is a block diagram of a device for processing voiceprint authentication according to an embodiment of the present disclosure.

FIG. 7 is a block diagram of a device for processing voiceprint authentication according to an embodiment of the present disclosure.

As shown in FIG. 7, the device for processing voiceprint authentication includes following modules.

An extracting module 11 is configured to extract a first feature vector for each first speech segment of a training set by a gender-mixed voiceprint baseline system based on DNN.

A generating module 12 is configured to train a gender classifier according to the first feature vector for each first speech segment and a pre-labeled first gender label of each first speech segment.

A first training module 13 is configured to train DNN models for different genders respectively according to speech data of different genders of the training set.

A second training module 14 is configured to train uniform background models, feature vector extracting models and linear probability discriminant analysis models for different genders respectively according to the DNN models for different genders and the speech data of different genders of the training set.

It is to be explained that the explanation in above embodiments of method for voiceprint authentication processing is also applicable to the embodiments of device for voiceprint processing, which is not described here.

With the device for processing voiceprint authentication according to embodiments of the present disclosure, by extracting the first feature vector for each first speech segment of the training set by the gender-mixed voiceprint baseline system based on Deep Neural Network, training the gender classifier according to the first feature vector for each first speech segment and the pre-labeled first gender label of each first speech segment, training the Deep Neural Network models for different genders respectively according to the speech data of different genders of the training set, training the uniform background models, feature vector extracting models and linear probability discriminant analysis models for different genders respectively according to the Deep Neural Network models for different genders and the speech data of different genders of the training set, the voiceprint authentication processing model for distinguishing gender is built, thus improving the efficiency and accuracy of voiceprint authentication.

Figure 8:
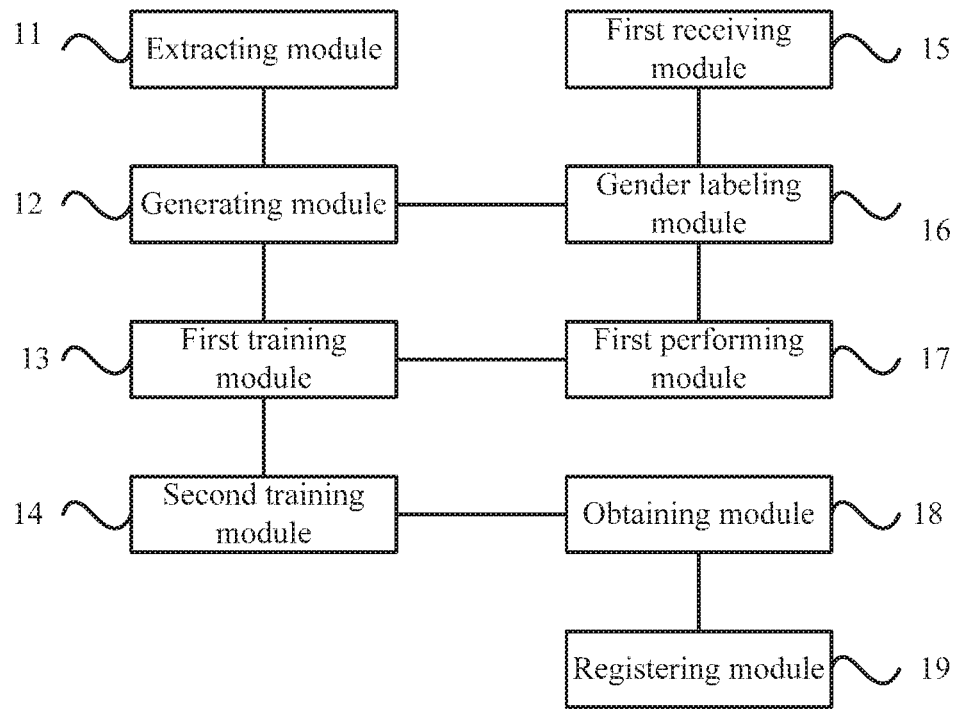
FIG. 8 is a block diagram of a device for processing voiceprint authentication according to another embodiment of the present disclosure.

FIG. 8 is a block diagram of a device for processing voiceprint authentication according to another embodiment of the present disclosure. As shown in FIG. 8, based on the embodiment shown in FIG. 7, the device for processing voiceprint authentication further includes the following modules.

A first receiving module 15 is configured to receive a voiceprint registration request with a first user identifier sent by a user.

A gender labeling module 16 is configured to obtain a plurality of second speech segments for voiceprint registration sent by the user, to extract first feature information of the first second speech segment in the plurality of second speech segments, and to obtain a second gender label of the first feature information by the gender classifier.

A first performing module 17 is configured to obtain posterior probabilities for each second speech segment to a DNN model corresponding to the second gender label; and to extract a second feature vector for each second speech segment according to a uniform background model corresponding to the second gender label and a feature vector extracting model corresponding to the second gender label.

An obtaining module 18 is configured to obtain a voiceprint registration model of the user according to a plurality of second feature vectors corresponding to the plurality of second speech segments respectively.

A registering module 19 is configured to store a correspondence of the first user identifier, the second gender label and the voiceprint registration model into a voiceprint registration database.

In an embodiment, the obtaining module 18 is configured to obtain an average feature vector of the plurality of second feature vectors as the voiceprint registration model of the user.

It is to be explained that the explanation in above embodiments of method for voiceprint authentication processing is also applicable to the embodiments of device for voiceprint processing, which is not described here.

With the device for processing voiceprint authentication according to embodiments of the present disclosure, firstly, obtaining the gender label of the first one of the second speech segments from the user by the gender classifier, obtaining the posterior probabilities of each second speech segment according to the DNN model corresponding to the gender label, extracting the second feature vector for each second speech segment respectively according to the uniform background model and the feature vector extracting model corresponding to the gender label, obtaining the voiceprint registration model of the user according to the second feature vectors, and storing the correspondence of the user identifier, the gender label and the voiceprint registration model into the voiceprint registration database, thus a voiceprint authentication processing model for distinguishing gender is built, improving the efficiency and accuracy of voiceprint authentication.

Figure 9:
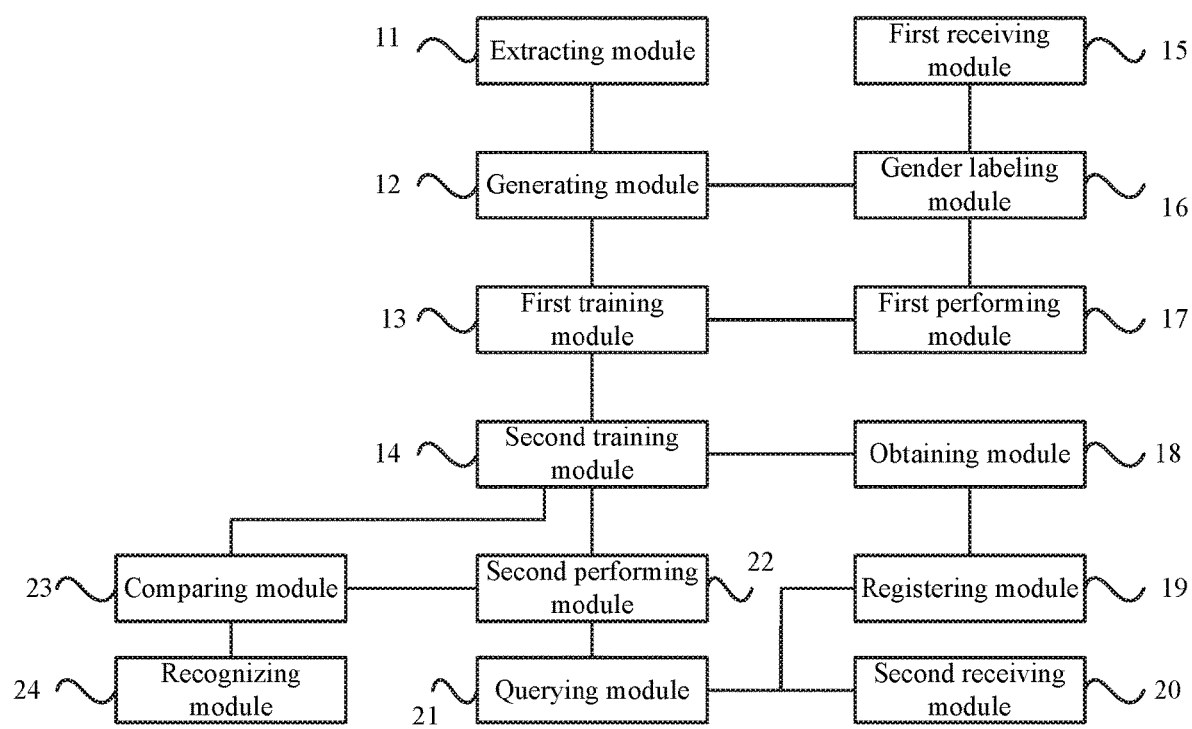
FIG. 9 is a block diagram of a device for processing voiceprint authentication according to another embodiment of the present disclosure.

FIG. 9 is a block diagram of a device for processing voiceprint authentication according to another embodiment of the present disclosure. As shown in FIG. 9, based on the embodiment shown in FIG. 8, the device for processing voiceprint authentication further includes the following modules.

A second receiving module 20 is configured to receive a voiceprint recognition request with a second user identifier sent by a user.

A querying module 21 is configured to query the voiceprint registration database to obtain a third gender label corresponding to the second user identifier and a voiceprint registration model corresponding to the second user identifier.

A second performing module 22 is configured to obtain a third speech segment for voiceprint recognition sent by the user, and to obtain posterior probabilities of the third speech segment according to a DNN model corresponding to the third gender label, and to extract a second feature vector of the third speech segment according to a uniform background model corresponding to the third gender label and a feature vector extracting model corresponding to the third gender label.

A comparing module 23 is configured to obtain a similarity between the second feature vector of the third speech segment and the voiceprint registration model by a linear probability discriminant analysis model corresponding to the third gender label.

A recognizing module 24 is configured to return a voiceprint recognition result to the user according to the similarity and a preset threshold.

The recognizing module 24 is configured to compare the similarity and the preset threshold; if the similarity is greater than or equal to the preset threshold, to return a success of voiceprint recognition; and if the similarity is less than the preset threshold, to return a failure of voiceprint recognition.

It is to be explained that the explanation in above embodiments of method for voiceprint authentication processing is also applicable to the embodiments of device for voiceprint processing, which is not described here.

With the device for processing voiceprint authentication according to embodiments of the present disclosure, firstly, obtaining the third gender label and the voiceprint registration model corresponding to the second user identifier by querying the voiceprint registration database, extracting the second feature vector of the third speech segment according to the uniform background model and the feature vector extracting model corresponding to the third gender label, obtaining the similarity between the second feature vector of the third speech segment and the voiceprint registration model with the linear probability discriminant analysis model, and returning the voiceprint recognition result according to the similarity and the preset threshold, thus the voiceprint authentication processing model for gender distinguishing is built, improving the efficiency and accuracy of voiceprint authentication.

In order to implement the above embodiments, a storage medium according to embodiments of a third aspect of the present disclosure, is configured to store a computer program, in which the computer program is configured to implement the method for processing voiceprint authentication according to the embodiments of the first aspect of the present disclosure.

In order to implement the above embodiments, an apparatus for processing voiceprint authentication according to embodiments of a fourth aspect of the present disclosure includes: one or more processors; a storage; and one or more modules. The one or more modules are configured to be stored in the storage, and when executed by the one or more processors, the following acts are performed.

S101', a first feature vector for each first speech segment of a training set is extracted by a gender-mixed voiceprint baseline system based on Deep Neural Network.

S102', a gender classifier is trained according to the first feature vector for each first speech segment and a pre-labeled first gender label of each first speech segment.

S103', DNN models are trained for different genders respectively according to speech data of different genders of the training set.

S104', uniform background models, feature vector extracting models and linear probability discriminant analysis models for different genders are trained respectively according to the DNN models for different genders and the speech data of different genders of the training set.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Those skilled in the art shall understand that terms such as "first" and "second" are used herein for purposes of description and are not intended to indicate or imply relative importance or significance. Thus, the feature defined with "first" and "second" may comprise one or more this feature.

In the description of the present disclosure, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A computer-implemented method for processing voiceprint authentication, comprising:
    from a training set comprising one or more first speech segments and a corresponding pre-labeled first gender label for each first speech segment in the training set, extracting a first feature vector for each first speech segment of the training set by a gender-mixed voiceprint baseline system based on Deep Neural Network (DNN);
    training a gender classifier according to the first feature vector for each first speech segment and the corresponding pre-labeled first gender label of each first speech segment;
    training a male DNN model according to male speech data of the training set and training a female DNN model according to female speech data of the training set, wherein the male DNN model is configured to analyze male speech data and to output posterior probabilities corresponding to the male speech data, and the female DNN model is configured to analyze female speech data and to output posterior probabilities corresponding to the female speech data;
    training a male voiceprint authentication processing model according to the male DNN model and the male speech data of the training set, the male voiceprint authentication processing model including a uniform background model for male, feature vector extracting model for male, and linear probability discriminant analysis model for male; and
    training a female voiceprint authentication processing model according to the female DNN model and the female speech data of the training set, the female voiceprint authentication processing model including a uniform background model for female, feature vector extracting model for female, and linear probability discriminant analysis model for female,
    wherein:
        the uniform background model for male is configured to normalize the posterior probabilities corresponding to the male speech data;
        the uniform background model for female is configured to normalize the posterior probabilities corresponding to the female speech data;
        each of the feature vector extracting model for male and the feature vector extracting model for female is configured to receive the posterior probabilities corresponding to the male speech data and the posterior probabilities corresponding to the female speech data, respectively, and input speech data input by a user, and to extract a second feature vector of the input speech data according to a preset algorithm;

each of the linear probability discriminant analysis model for male and the linear probability discriminant analysis model for female is configured to obtain a similarity by comparing the second feature vector of the input speech data input by the user with a pre-stored voiceprint registration template.

2. The method according to claim 1, further comprising:

receiving a voiceprint registration request with a first user identifier sent by a user;

obtaining a plurality of second speech segments for voiceprint registration sent by the user, extracting first feature information of a first second speech segment in the plurality of second speech segments, and obtaining a second gender label of the first feature information by the gender classifier;

obtaining posterior probabilities for each second speech segment according to the male DNN model or the female DNN model corresponding to the second gender label;

extracting a second feature vector for each second speech segment according to the uniform background model for male or the uniform background model for female corresponding to the second gender label and the feature vector extracting model for male or the feature vector extracting model for female corresponding to the second gender label;

obtaining a voiceprint registration model of the user according to a plurality of second feature vectors corresponding to the plurality of second speech segments respectively;

storing a correspondence of the first user identifier, the second gender label and the voiceprint registration model into a voiceprint registration database.

3. The method according to claim 2, wherein obtaining a voiceprint registration model of the user according to a plurality of second feature vectors corresponding to the plurality of second speech segments respectively comprises an act of:

obtaining an average feature vector of the plurality of second feature vectors as the voiceprint registration model of the user.

4. The method according to claim 2, further comprising:

receiving a voiceprint recognition request with a second user identifier sent by a user;

obtaining a third gender label corresponding to the second user identifier and a voiceprint registration model corresponding to the second user identifier by querying the voiceprint registration database;

obtaining a third speech segment for voiceprint recognition sent by the user, and obtaining posterior probabilities of the third speech segment according to the male DNN model or the female DNN model corresponding to the third gender label;

extracting a third feature vector of the third speech segment according to the uniform background model for male or the uniform background model for female corresponding to the third gender label and the feature vector extracting model for male or the feature extracting model for female corresponding to the third gender label;

obtaining a similarity between the third feature vector of the third speech segment and the voiceprint registration model by the linear probability discriminant analysis model for male or the linear probability discriminant analysis model for female corresponding to the third gender label;

returning a voiceprint recognition result to the user according to the similarity and a preset threshold.

5. The method according to claim 4, wherein returning a voiceprint recognition result to the user according to the similarity and a preset threshold comprises acts of:

comparing the similarity and the preset threshold;

when the similarity is greater than or equal to the preset threshold, returning a success of voiceprint recognition;

when the similarity is less than the preset threshold, returning a failure of voiceprint recognition.

6. A non-transitory computer storage medium, having stored therein instructions that, when executed by a processor of a device, causes the device to perform the method for providing translation information, the method comprising:

from a training set comprising one or more first speech segments and a corresponding pre-labeled first gender label for each first speech segment in the training set, extracting a first feature vector for each first speech segment of the training set by a gender-mixed voiceprint baseline system based on Deep Neural Network (DNN);

training a gender classifier according to the first feature vector for each first speech segment and the corresponding pre-labeled first gender label of each first speech segment;

training a male DNN model according to male speech data of the training set and training a female DNN model according to female speech data of the training set, wherein the male DNN model is configured to analyze male speech data and to output posterior probabilities corresponding to the male speech data, and the female DNN model is configured to analyze female speech data and to output posterior probabilities corresponding to the female speech data;

training a male voiceprint authentication processing model according to the male DNN model and the male speech data of the training set, the male voiceprint authentication processing model including a uniform background model for male, feature vector extracting model for male, and linear probability discriminant analysis model for male; and training a female voiceprint authentication processing model according to the female DNN model and the female speech data of the training set, the female voiceprint authentication processing model including a uniform background model for female, feature vector extracting model for female, and linear probability discriminant analysis model for female, wherein:

the uniform background model for male is configured to normalize the posterior probabilities corresponding to the male speech data;

the uniform background model for female is configured to normalize the posterior probabilities corresponding to the female speech data;

each of the feature vector extracting model for male and the feature vector extracting model for female is configured to receive the posterior probabilities corresponding to the male speech data and the posterior probabilities corresponding to the female speech data, respectively, and input speech data input by a user, and to extract a second feature vector of the input speech data according to a preset algorithm;

each of the linear probability discriminant analysis model for male and the linear probability discriminant analysis model for female is configured to obtain a similarity by comparing the second feature vector of the input speech data input by the user with a pre-stored voiceprint registration template.

7. The non-transitory computer storage medium according to claim 6, wherein the method further comprises:
receiving a voiceprint registration request with a first user identifier sent by a user;
obtaining a plurality of second speech segments for voiceprint registration sent by the user, extracting first feature information of a first second speech segment in the plurality of second speech segments, and obtaining a second gender label of the first feature information by the gender classifier;
obtaining posterior probabilities for each second speech segment according to the male DNN model or the female DNN model corresponding to the second gender label;
extracting a second feature vector for each second speech segment according to the uniform background model for male or the uniform background model for female corresponding to the second gender label and the feature vector extracting model for male or the feature vector extracting model for female corresponding to the second gender label;
obtaining a voiceprint registration model of the user according to a plurality of second feature vectors corresponding to the plurality of second speech segments respectively;
storing a correspondence of the first user identifier, the second gender label and the voiceprint registration model into a voiceprint registration database.

8. The non-transitory computer storage medium according to claim 7, wherein obtaining a voiceprint registration model of the user according to a plurality of second feature vectors corresponding to the plurality of second speech segments respectively comprises an act of:
obtaining an average feature vector of the plurality of second feature vectors as the voiceprint registration model of the user.

9. The non-transitory computer storage medium according to claim 6, wherein the method further comprises:
receiving a voiceprint recognition request with a second user identifier sent by a user;
obtaining a third gender label corresponding to the second user identifier and a voiceprint registration model corresponding to the second user identifier by querying the voiceprint registration database;
obtaining a third speech segment for voiceprint recognition sent by the user, and obtaining posterior probabilities of the third speech segment according to the male DNN model or the female DNN model corresponding to the third gender label;
extracting a third feature vector of the third speech segment according to the uniform background model for male or the uniform background model for female corresponding to the third gender label and the feature vector extracting model for male or the feature extracting model for female corresponding to the third gender label;
obtaining a similarity between the third feature vector of the third speech segment and the voiceprint registration model by the linear probability discriminant analysis model for male or the linear probability discriminant analysis model for female corresponding to the third gender label;
returning a voiceprint recognition result to the user according to the similarity and a preset threshold.

10. The non-transitory computer storage medium according to claim 9, wherein returning a voiceprint recognition result to the user according to the similarity and a preset threshold comprises acts of:
comparing the similarity and the preset threshold;
when the similarity is greater than or equal to the preset threshold, returning a success of voiceprint recognition;
when the similarity is less than the preset threshold, returning a failure of voiceprint recognition.

11. An apparatus for processing voiceprint authentication, comprising:
one or more processors;
a storage;
one or more modules stored in the storage, and when executed by the one or more processors, perform following acts:
from a training set comprising one or more first speech segments and a corresponding pre-labeled first gender label for each first speech segment in the training set, extracting a first feature vector for each first speech segment of the training set by a gender-mixed voiceprint baseline system based on Deep Neural Network (DNN);
training a gender classifier according to the first feature vector for each first speech segment and the corresponding pre-labeled first gender label of each first speech segment;
training a male DNN model according to male speech data of the training set and training a female DNN model according to female speech data of the training set, wherein the male DNN model is configured to analyze male speech data and to output posterior probabilities corresponding to the male speech data, and the female DNN model is configured to analyze female speech data and to output posterior probabilities corresponding to the female speech data;
training a male voiceprint authentication processing model according to the male DNN model and the male speech data of the training set, the male voiceprint authentication processing model including a uniform background model for male, feature vector extracting model for male, and linear probability discriminant analysis model for male; and
training a female voiceprint authentication processing model according to the female DNN model and the female speech data of the training set, the female voiceprint authentication processing model including a uniform background model for female, feature vector extracting model for female, and linear probability discriminant analysis model for female,
wherein:
the uniform background model for male is configured to normalize the posterior probabilities corresponding to the male speech data;
the uniform background model for female is configured to normalize the posterior probabilities corresponding to the female speech data;
each of the feature vector extracting model for male and the feature vector extracting model for female is configured to receive the posterior probabilities corresponding to the male speech data and the posterior probabilities corresponding to the female speech data, respectively, and input speech data input by a user, and to extract a second feature vector of the input speech data according to a preset algorithm;

each of the linear probability discriminant analysis model for male and the linear probability discriminant analysis model for female is configured to obtain a similarity by comparing the second feature vector of the input speech data input by the user with a pre-stored voiceprint registration template.

12. The apparatus according to claim 11, wherein when the one or more modules are executed by the one or more processors, to perform following acts:

receiving a voiceprint registration request with a first user identifier sent by a user;

obtaining a plurality of second speech segments for voiceprint registration sent by the user, extracting first feature information of a first second speech segment in the plurality of second speech segments, and obtaining a second gender label of the first feature information by the gender classifier;

obtaining posterior probabilities for each second speech segment according to the male DNN model or the female DNN model corresponding to the second gender label;

extracting a second feature vector for each second speech segment according to the uniform background model for male or the uniform background model for female corresponding to the second gender label and the feature vector extracting model for male or the feature vector extracting model for female corresponding to the second gender label;

obtaining a voiceprint registration model of the user according to a plurality of second feature vectors corresponding to the plurality of second speech segments respectively;

storing a correspondence of the first user identifier, the second gender label and the voiceprint registration model into a voiceprint registration database.

13. The apparatus according to claim 12, wherein obtaining a voiceprint registration model of the user according to a plurality of second feature vectors corresponding to the plurality of second speech segments respectively comprises an act of:

obtaining an average feature vector of the plurality of second feature vectors as the voiceprint registration model of the user.

14. The apparatus according to claim 11, wherein when the one or more modules are executed by the one or more processors, to perform following acts:

receiving a voiceprint recognition request with a second user identifier sent by a user;

obtaining a third gender label corresponding to the second user identifier and a voiceprint registration model corresponding to the second user identifier by querying the voiceprint registration database;

obtaining a third speech segment for voiceprint recognition sent by the user, and obtaining posterior probabilities of the third speech segment according to the male DNN model or the female DNN model corresponding to the third gender label;

extracting a third feature vector of the third speech segment according to the uniform background model for male or the uniform background model for female corresponding to the third gender label and the feature vector extracting model for male or the feature extracting model for female corresponding to the third gender label;

obtaining a similarity between the third feature vector of the third speech segment and the voiceprint registration model by the linear probability discriminant analysis model for male or the linear probability discriminant analysis model for female corresponding to the third gender label;

returning a voiceprint recognition result to the user according to the similarity and a preset threshold.

15. The apparatus according to claim 14, wherein returning a voiceprint recognition result to the user according to the similarity and a preset threshold comprises acts of:

comparing the similarity and the preset threshold;

when the similarity is greater than or equal to the preset threshold, returning a success of voiceprint recognition;

when the similarity is less than the preset threshold, returning a failure of voiceprint recognition.

* * * * *